United States Patent Office.

WALTER T. SCHEELE, OF RAHWAY, NEW JERSEY, ASSIGNOR TO CARL BERINGER, OF SAME PLACE.

PROCESS OF MAKING COLORING EXTRACTS.

SPECIFICATION forming part of Letters Patent No. 610,282, dated September 6, 1898.

Application filed May 11, 1898. Serial No. 680,413. (No specimens.)

*To all whom it may concern:*

Be it known that I, WALTER T. SCHEELE, a citizen of Germany, and a resident of Rahway, New Jersey, have invented certain new and useful Improvements in Processes of Extracting Coloring-Matter from Vegetable Substances, of which the following is a specification.

This invention relates to improved means for extracting chemically-pure coloring principles from vegetable substances, such as dyewoods, dye-barks, dye-berries, dye-flowers, dye roots, tubes, and bulbs, and certain vegetable organisms growing in deep-water seas.

One class of solvents heretofore known and classed as "direct" solvents—such as alcohol, ether, and acetone—would partly, but not completely, extract the coloring principles from vegetable substances. Another class can be produced only by the mixture of two or more different substances, such as water and soda, water and glycerin, or water and mineral or organic acids, or water alone with the help of pressure and heat.

My invention has for its object to improve upon the above state of the art and to furnish a direct, absolute, and exhaustive solvent for any vegetable coloring-matter. Such direct solvents I have found to be ethylmethyl, diethyl, dipropyl, ethyl,capron,butyl, propyl, ethylbutyl, methyl valeral, valeron, and methylamyl ketones, which for the purpose of this invention are equivalents. These ketones have their boiling-point between 80° and 227° Celsius, while acetone has a boiling-point of but 56° Celsius. These ketones can be used singly or intermixed in different proportions, the proportions differing, of course, with the vegetable matter treated.

Example: For the extraction of the coloring principles from logwood, hematoxylin, and hematin combined I cover the logwood chips with either or a mixture of the above-specified ketones. The extraction of the coloring-matter will be complete after the solvent has been in contact with the logwood for about one hour, preferably at a temperature of about 90° Fahrenheit. Acetone dissolves tannic acid, vegetable albuminous substances, and glucosides, but little or no coloring-matter, while the ketones above enumerated and having a higher boiling-point rapidly and completely dissolve the coloring-matter without dissolving the tannin or the natural impurities. Thus I obtain pure and strong shades, and, moreover, the coloring principles extracted will not be subject to fermentation or decomposition.

What I claim is—

The process of extracting the coloring principle from vegetable substances, which consists in treating the latter with ketones having their boiling-point between 80° and 227° Celsius, substantially as specified.

Signed by me at Rahway, New Jersey, this 9th day of May, 1898.

WALTER T. SCHEELE.

Witnesses:
CHAS. H. LAMBERT,
HARRISON M. DURAND.